(12) United States Patent
Singh

(10) Patent No.: US 10,847,274 B2
(45) Date of Patent: Nov. 24, 2020

(54) EARTHQUAKE-RESISTANT FUEL STORAGE RACK SYSTEM FOR FUEL POOLS IN NUCLEAR PLANTS

(71) Applicant: Holtec International, Camden, NJ (US)

(72) Inventor: Krishna P. Singh, Hobe Sound, FL (US)

(73) Assignee: Holtec International

( * ) Notice: Subject to any disclaimer, the term of this patent is extended or adjusted under 35 U.S.C. 154(b) by 357 days.

(21) Appl. No.: 15/618,774

(22) Filed: Jun. 9, 2017

(65) Prior Publication Data

US 2018/0247720 A1    Aug. 30, 2018

Related U.S. Application Data

(60) Provisional application No. 62/463,319, filed on Feb. 24, 2017.

(51) Int. Cl.
*G21C 19/07*    (2006.01)

(52) U.S. Cl.
CPC .................... *G21C 19/07* (2013.01)

(58) Field of Classification Search
CPC ........... G21C 19/07; G21C 9/04; G21C 19/40
USPC ........................................................ 376/272
See application file for complete search history.

(56) References Cited

U.S. PATENT DOCUMENTS

| 4,436,693 | A | * | 3/1984 | Zezza ................... G21C 19/07 376/272 |
| 4,820,472 | A | | 4/1989 | Machado et al. |
| 4,889,681 | A | * | 12/1989 | Wachter ................. G21C 19/07 376/272 |
| 5,245,641 | A | | 9/1993 | Machado et al. |
| 8,860,231 | B2 | | 2/2014 | Kielbowiez |

(Continued)

FOREIGN PATENT DOCUMENTS

| DE | 3430180 | 2/1986 |
| JP | 2012073136 | 4/2012 |
| JP | 2015-152443 A | 8/2015 |

OTHER PUBLICATIONS

Corresponding EP Search Report for Application No. 18158156.2, dated Jun. 25, 2018.

(Continued)

*Primary Examiner* — Jack W Keith
*Assistant Examiner* — Daniel Wasil
(74) *Attorney, Agent, or Firm* — The Belles Group, P.C.

(57) ABSTRACT

A seismic-resistant fuel storage system for a nuclear fuel pool includes a lined fuel pool and a fuel rack comprising tubular nuclear fuel storage cells attached to a common baseplate. Pedestals protrude downwardly from the baseplate supporting the rack on the pool base slab. Spaced embedment plates are fixedly anchored to the base slab to eliminate relative movement between the plates and pool liner. The embedment plates comprise upwardly open recessed receptacles each entrapping one of the rack pedestals therein. The receptacles are configured such that lateral movement of the fuel rack along the base slab in the event of a seismic event is constrained via engagement between receptacle walls and pedestals. Lateral seismic loads are not transferred to the pool liner. In some embodiments, the baseplates in the pool are coplanar and may be abutting engaged to mitigate rack movement during a seismic event.

19 Claims, 14 Drawing Sheets

(56) References Cited

U.S. PATENT DOCUMENTS

2010/0177858 A1\* 7/2010 Kielbowicz ............ G21C 19/07
                                                                              376/272
2015/0221402 A1    8/2015 Singh
2015/0310947 A1  10/2015 Singh et al.

OTHER PUBLICATIONS

Korean Office Action issued in Corresponding Korean Application No. 10-2018-0021655 dated Sep. 19, 2019.

\* cited by examiner

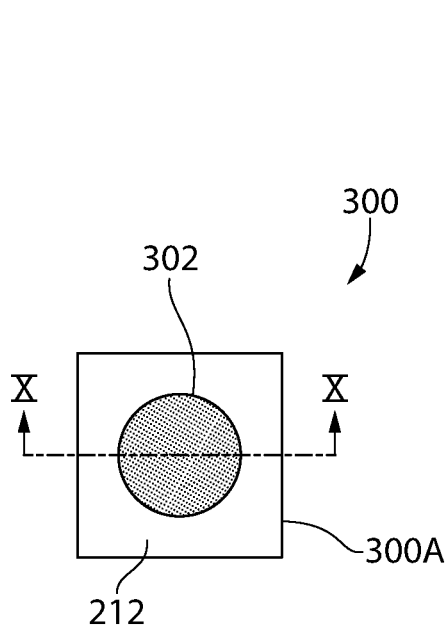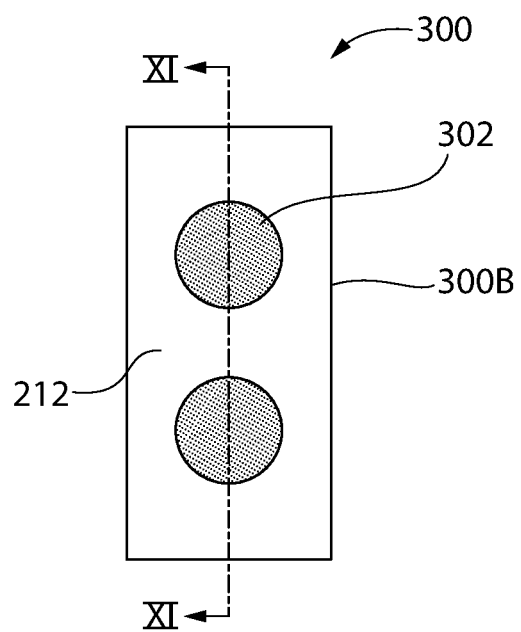
FIG. 7   FIG. 8
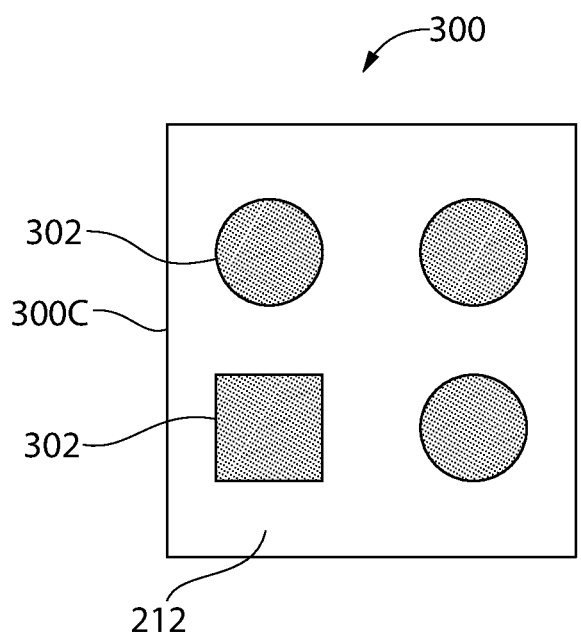
FIG. 9

EARTHQUAKE-RESISTANT FUEL STORAGE RACK SYSTEM FOR FUEL POOLS IN NUCLEAR PLANTS

CROSS-REFERENCE TO RELATED APPLICATIONS

The present application claims the benefit of priority to U.S. Provisional Application No. 62/463,319 filed Feb. 24, 2017, the entirety of which is incorporated herein by reference.

BACKGROUND

The present invention generally relates to storage of nuclear fuel, and more particularly to an improved seismic-resistant nuclear fuel storage rack system for a fuel pool in a nuclear generation plant.

A conventional high density nuclear fuel storage rack is a cellular structure supported on a set of pedestals, as shown in FIG. 1. The bottom extremity of each fuel storage cell is welded to a common baseplate which serves to provide the support surface for the upwardly extending storage cells and stored nuclear fuel therein. The cellular region comprises of a set of narrow prismatic cavities formed by the cells which are each sized to accept a single nuclear fuel assembly comprising either new or spent fuel. The term "active fuel region" denotes the vertical space above the baseplate where the enriched uranium is located. A principal safety function of the fuel rack is to protect the geometry of the "active fuel region" from being adversely affected under any credible accident event, the most severe of them being the plant's postulated earthquake events.

A conventional rack has four or more pedestals (see, e.g. FIG. 1). Under an earthquake event, the rack behaves as a cantilever beam exerting significant stresses in the bottom pedestals. The standard practice of fastening the pedestals to the fuel pool's bottom concrete slab has the serious drawback of making the removal of the racks at a future date, submerged in about a 40 feet deep pool of water, extremely onerous. The consideration of convenient decommissioning with minimum dose to the plant personnel and the ability to "rerack" (if necessary), has led the industry to install racks in a "free-standing" configuration. The free-standing rack design configuration has become the dominant method over the past 30 years for installing wet storage capacity for used nuclear fuel in plants around the world. As would be expected, the rack modules are made as large as possible, limited only by the constraint of shipping them from the manufacturing facility to the plant and handling them within the plant for in-pool installation. They are also placed as close to each other as possible in the so-called "high density configuration" to maximize the in-pool fuel storage capacity. The inter-module gap between adjacent fuel racks can be as little as 2 inches in some installations.

Free standing fuel racks resist seismic loads primarily by the reactive friction at the pedestal to pool surface interface and the so-called fluid coupling effect. In a conventional free-standing fuel rack, the pedestals are supported on the fuel pool bottom base slab on some type of bearing pad as shown in FIG. 1. However, if the earthquake is strong, then the interface friction may not be adequate to prevent lateral sliding movement or tipping/twisting of the racks, causing them to collide and creating a risk of damaging the cells and compromising the physical integrity of the stored nuclear fuel.

An improved earth-quake resistant nuclear fuel rack storage system is desired.

SUMMARY

Embodiments of the present invention provide a seismic-resistant nuclear fuel rack stabilization system for a fuel pool that seeks to limit the kinematics of the racks and prevent damage to their active fuel region within their cellular structure during severe earthquakes. The present system is thus intended for use in high seismic scenarios, for example if the "zero period acceleration" (ZPA) of any of the earthquake's components exceeds 0.5 g. Features of embodiments of the present seismic-resistant design is that the rack modules are not fastened to the pool slab providing "free standing" fuel racks, but advantageously are substantially restrained against lateral horizontal movement during earthquakes and further provide the hardest location in the body of the module—their baseplates—to serve as the bumper to absorb impact loadings from other adjacent racks under earthquakes.

In one aspect, a seismic-resistant nuclear fuel storage system includes: a fuel pool comprising a base slab and plurality of vertical sidewalls collectively defining a cavity configured for wet storage of nuclear fuel; a fuel rack comprising a plurality of vertically elongated tubular cells each defining a prismatic cavity configured for storing nuclear fuel therein, the cells attached to a common baseplate; a plurality of pedestals protruding downwardly from the baseplate; a plurality of spaced apart embedment plates fixedly anchored to the base slab, each embedment plate comprising an upwardly open receptacle having receptacle walls defining a receptacle depth, each receptacle receiving and entrapping one of the pedestals of the fuel rack therein; wherein the embedment plate receptacles are configured such that lateral movement of the fuel rack along the base slab in the event of a seismic event is constrained by engagement between the receptacle walls of each receptacle and the pedestals.

In another aspect, a fuel rack stabilization system for seismic-resistant storage of nuclear fuel includes: a fuel pool comprising a base slab and plurality of vertical sidewalls collectively defining a cavity configured for submerged wet storage of nuclear fuel; a plurality of fuel racks supported on the base slab, each fuel rack comprising a plurality of vertically elongated tubes each defining a prismatic cavity configured for storing nuclear fuel therein, the tubes attached to a common baseplate; each fuel rack comprising a plurality of spaced apart pedestals protruding downwardly from the baseplate; a plurality of spaced apart embedment plates fixedly anchored to the base slab, each embedment plate comprising at least one upwardly open embedment cavity having cavity walls, the cavities each receiving and entrapping a respective one of the pedestals of the fuel racks therein; a pool liner secured to the base slab of the fuel pool, the pool liner extending between the plurality of spaced apart embedment plates and having a thickness less than the embedment plate; wherein a perimeter of the embedment plates is hermetically seal welded to the pool liner around all lateral sides to form an impervious barrier to outward leakage of pool water from the fuel pool; wherein the embedment plate cavities are configured such that lateral movement of the fuel rack along the base slab caused by a seismic event is restricted by engagement between the cavity walls of each cavity and the pedestal such that laterally acting seismic forces are not transmitted to the pool liner.

In another aspect, a method for seismic-resistant storage of nuclear fuel in a fuel pool comprises: staging first and second fuels racks in a nuclear facility, each fuel rack comprising a plurality of tubes each defining a prismatic cavity configured for storing nuclear fuel therein, the tubes supported on a common baseplate comprising a plurality of pedestals protruding downwardly from the baseplate; lowering the first fuel rack into a water-filled fuel pool comprising a base slab and a metal pool liner secured to base slab; and insertably engaging each of the pedestals of the first fuel rack with corresponding upwardly open receptacles formed in a plurality of spaced apart embedment plates fixedly anchored to the base slab of the fuel pool, each embedment plate hermetically seal welded to the pool to form an impervious barrier to outward leakage of pool water through the base slab of the fuel pool; wherein the embedment plates are configured such that lateral movement of the pedestals along the base slab during a seismic event is restricted by engagement between the pedestals and the receptacles of the embedment plates such that laterally acting seismic forces are not transmitted to the pool liner. In some embodiments, the method may further include lowering the second fuel rack into the water-filled fuel pool; insertably engaging each of the pedestals of the second fuel rack with corresponding upwardly open receptacles formed in the plurality of spaced apart embedment plates fixedly coupled to the base slab of the fuel pool; and abuttingly engaging a peripheral edge of the baseplate of the first fuel rack with an adjoining peripheral edge of the baseplate of the second fuel rack.

Further areas of applicability of the present invention will become apparent from the detailed description provided hereinafter.

BRIEF DESCRIPTION OF THE DRAWINGS

The features of the exemplary embodiments will be described with reference to the following drawings where like elements are labeled similarly, and in which:

FIG. 7 is a top plan view of a first embedment plate according to the present disclosure for laterally constraining movement of a fuel rack pedestal;

FIG. 8 is a top plan view of a second embedment plate;

FIG. 9 is a top plan view of a third embedment plate;

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a figure number (e.g. FIG. 1) shall be construed to be a reference to all alphabetical subpart figures in the group (e.g. FIGS. 1A, 1B, etc.) unless otherwise indicated.

DETAILED DESCRIPTION

Figure 1A:
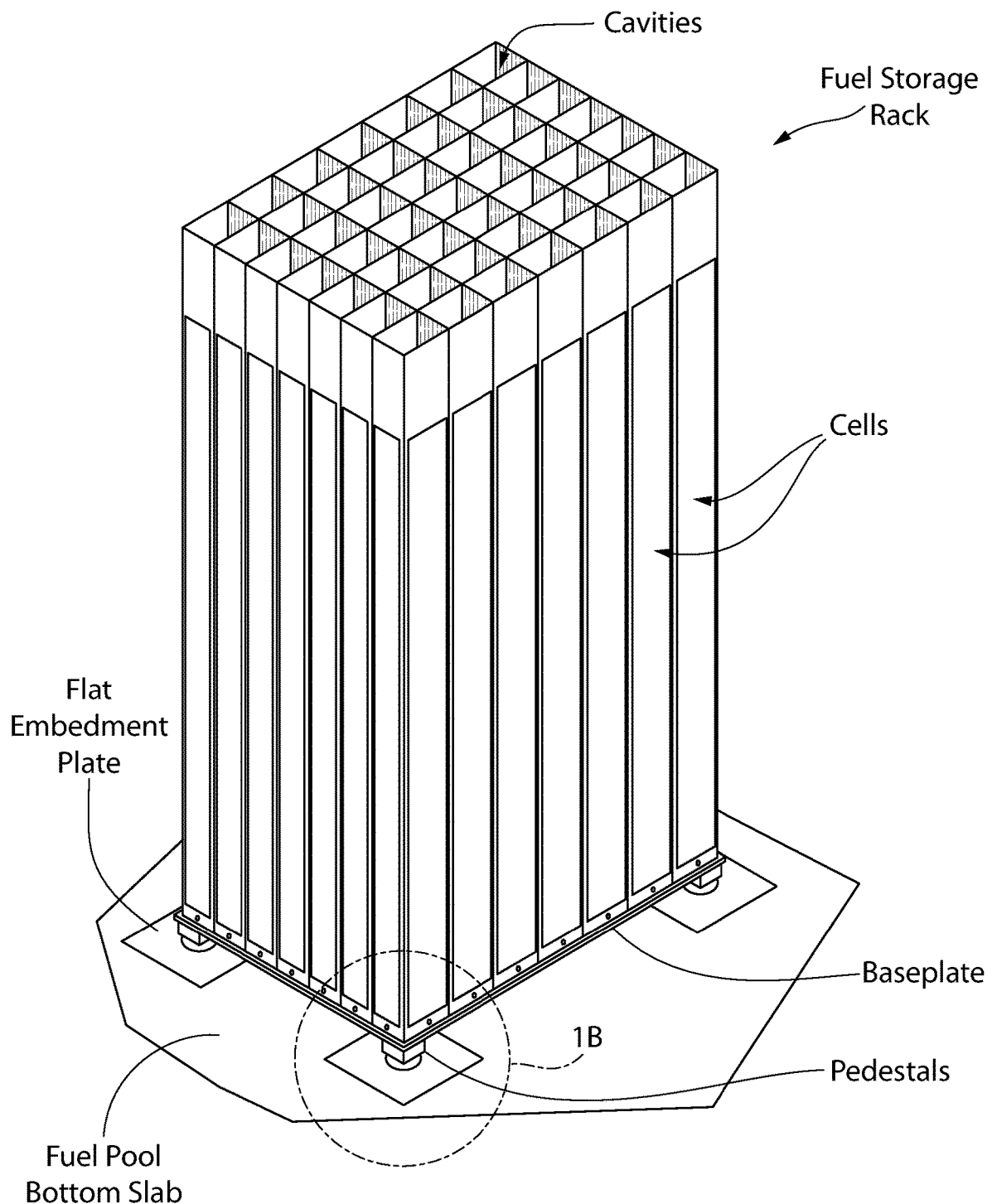
FIG. 1A is a perspective view of a conventional nuclear fuel storage system for a fuel pool.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features. Furthermore, all features and designs disclosed herein may be used in combination even if not explicitly described as such.

In the description of embodiments disclosed herein, any reference to direction or orientation is merely intended for convenience of description and is not intended in any way to limit the scope of the present invention. Relative terms such as "lower," "upper," "horizontal,", "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. It will be appreciated that any numerical ranges that may be described herein shall be understood to include the lower and upper numerical terminus values or limits of the cited range, and any numerical values included in the cited range may serve as the terminus values.

Figure 3A:
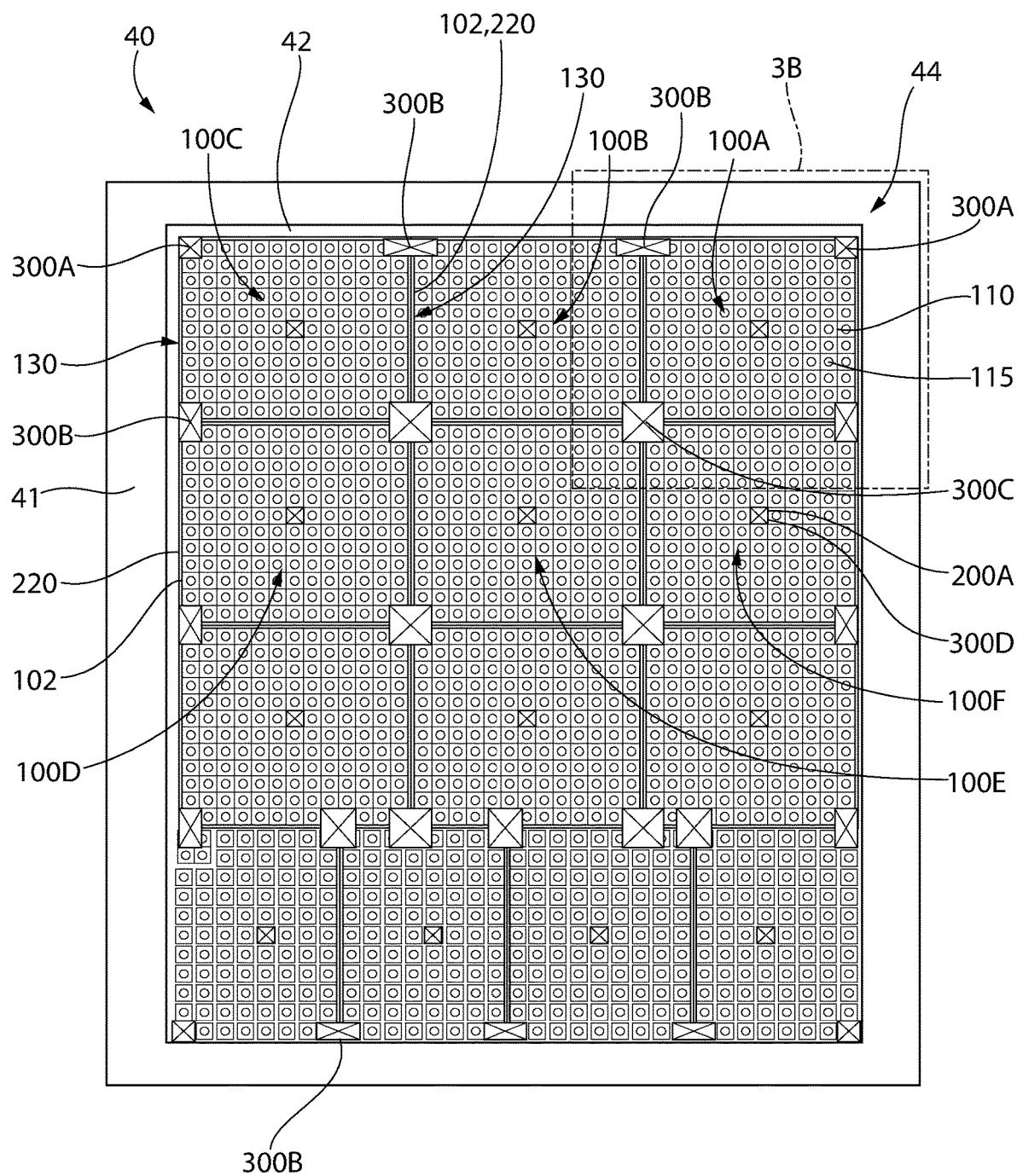
FIG. 3A is a top plan view of a nuclear fuel wet storage system comprising a nuclear fuel pool containing multiple fuel racks of FIG. 2A forming a wet nuclear fuel storage system.
Figure 3B:
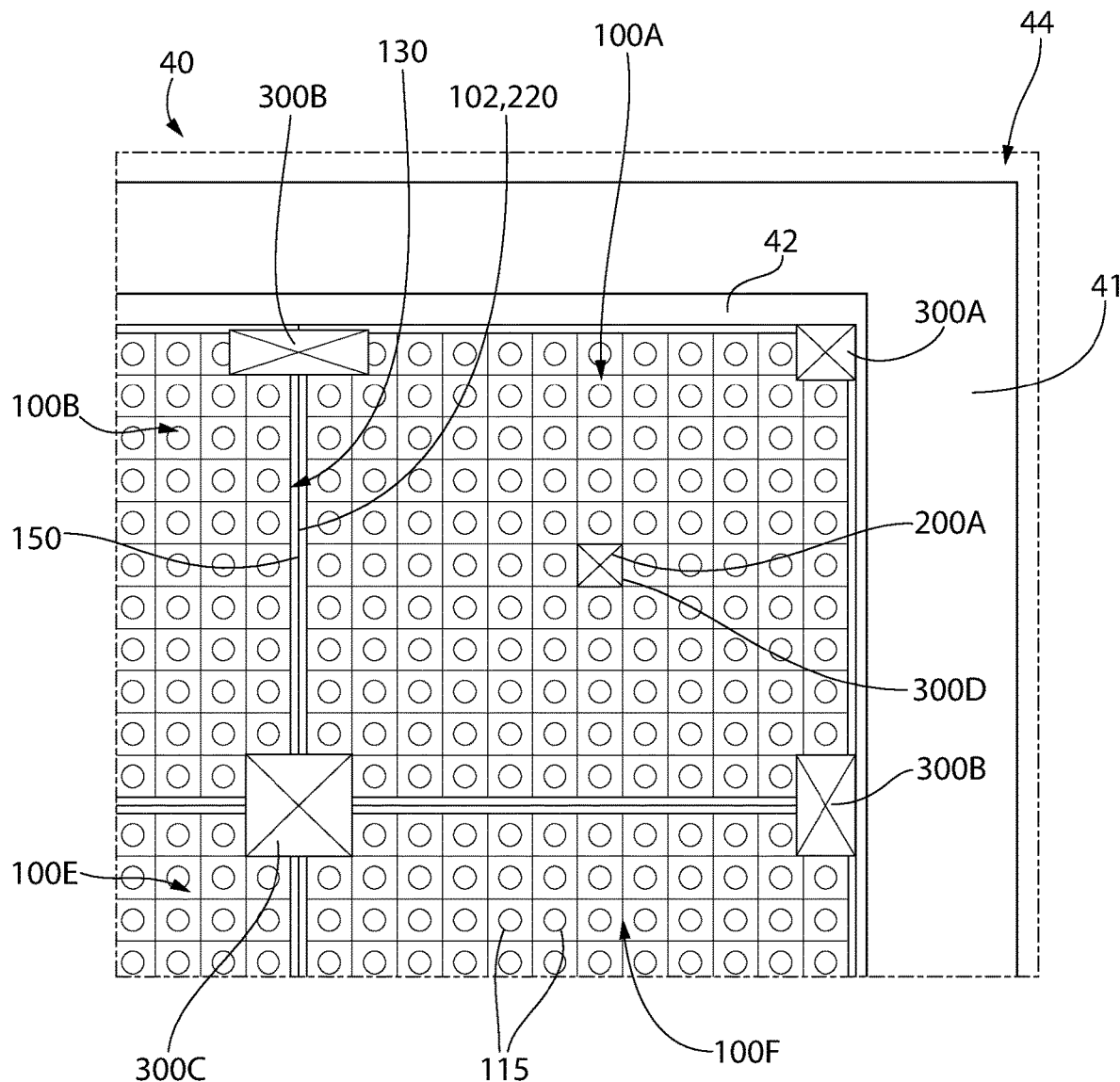
FIG. 3B is a detail taken from FIG. 3A.
Figure 6:
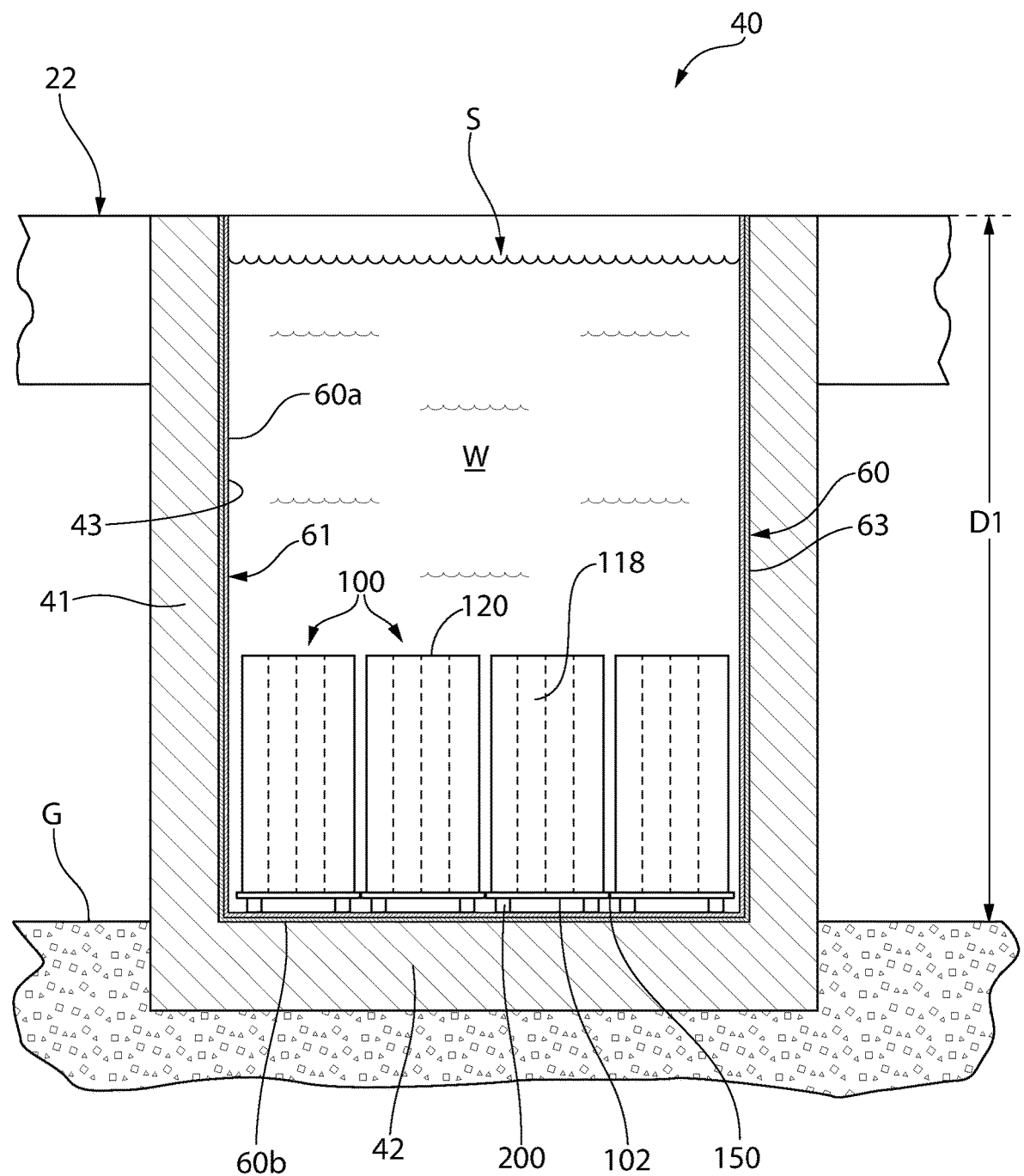
FIG. 6 is a side elevation partial cross sectional view of a nuclear fuel wet storage system comprising the fuel pool and multiple fuel racks.
Figure 10:
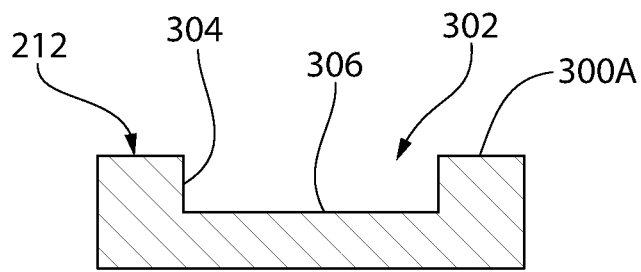
FIG. 10 is a side cross sectional view taken along lines X-X in FIG. 7.
Figure 11:
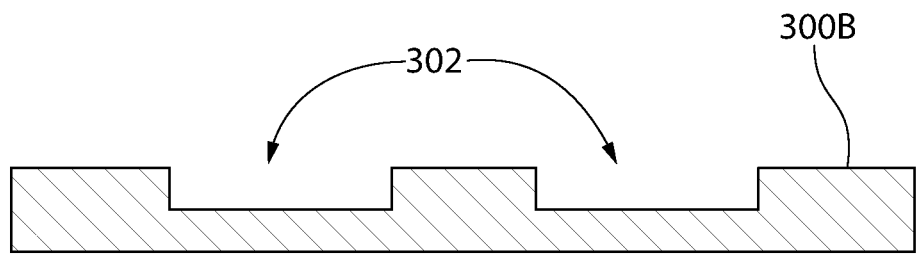
FIG. 11 is a side cross sectional view taken along lines XI-XI in FIG. 8.

Referring to FIGS. 3 and 6, a nuclear facility 30 which may be a nuclear generating plant includes a fuel pool 40 according to the present disclosure configured for storing a plurality of nuclear fuel racks 100. The fuel pool 40 may comprise a plurality of vertical sidewalls 41 rising upwards from an adjoining substantially horizontal bottom base wall or slab 42 (recognizing that some slope may intentionally be provided in the upper surface of the base slab for drainage toward a low point if the pool is to be emptied and rinsed/decontaminated at some time and due to installation tolerances). The base slab 42 and sidewalls 41 may be formed of reinforced concrete in one non-limiting embodiment. The fuel pool base slab 42 may be formed in and rest on the soil sub-grade 26, the top surface of which defines grade G. In this embodiment illustrated in the present application, the sidewalls are elevated above grade. The base slab 42 may be located at grade G as illustrated, below grade, or elevated above grade. In other possible embodiments contemplated, the base slab 42 and sidewalls 41 may alternatively be buried in sub-grade 26 which surrounds the outer surfaces of the sidewalls. Any of the foregoing arrangements or others may be used depending on the layout of the nuclear facility and does not limit of the invention.

In one embodiment, the fuel pool 40 may have a rectilinear shape in top plan view. Four sidewalls 41 may be provided in which the pool has an elongated rectangular shape (in top plan view) with two longer opposing sidewalls and two shorter opposing sidewalls (e.g. end walls). Other configurations of the fuel pool 40 are possible such as square shapes, other polygonal shapes, and non-polygonal shapes.

Figure 13:
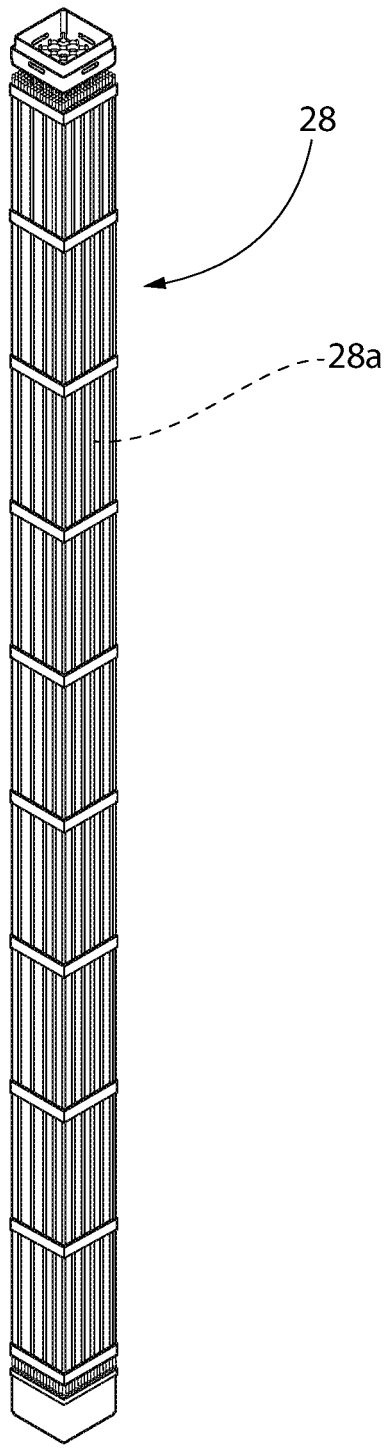
FIG. 13 is a perspective view of a nuclear assembly.

The sidewalls 41 and base slab 42 of the fuel pool 40 define an upwardly open well or cavity 43 configured to hold cooling pool water W and the plurality of submerged nuclear fuel racks 100 each holding multiple nuclear fuel bundles or assemblies 28 (a typical one shown in FIG. 13). Each fuel assembly 28 contains multiple individual new or spent uranium fuel rods 28a. Fuel assemblies are further described in commonly assigned U.S. patent application Ser. No. 14/413,807 filed Jul. 9, 2013, which is incorporated herein by reference in its entirety. Typical fuel assemblies 28 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each. The fuel racks 100 storing the fuel assemblies are emplaced on the base slab 42 in a high-density arrangement in the horizontally-abutting manner as further described herein.

The fuel pool 40 extends from an operating deck 22 surrounding the fuel pool 40 downwards to a sufficient vertical depth D1 to submerge the fuel assemblies 28 in the fuel rack (see, e.g. FIG. 6) beneath the surface level S of the pool water W for proper radiation shielding purposes. The substantially horizontal operating deck 22 that circumscribes the sidewalls 41 and pool 40 on all sides in one embodiment may be formed of steel and/or reinforced concrete. In one implementation, the fuel pool may have a depth such that at least 10 feet of water is present above the top of the fuel assembly. Other suitable depths for the pool and water may be used of course. The surface level of pool water W (i.e. liquid coolant) in the pool 40 may be spaced below the operating deck 22 by a sufficient amount to prevent spillage onto the deck during fuel assembly loading or unloading operations and to account to seismic event. In one non-limiting embodiment, for example, the surface of the operating deck 22 may be at least 5 feet above the maximum 100 year flood level for the site in one embodiment. The fuel pool 40 extending below the operating deck level may be approximately 40 feet or more deep (e.g. 42 feet in one embodiment). The fuel pool is long and wide enough to accommodate as many fuel racks 100 and fuel assemblies 28 stored therein as required. There is sufficient operating deck space around the pool to provide space for the work crew and for staging necessary tools and equipment for the facility's maintenance. There may be no penetrations in the fuel pool 40 within the bottom 30 feet of depth to prevent accidental draining of water and uncovering of the fuel.

In some embodiments, a nuclear fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877,217 filed Oct. 7, 2015, which is incorporated herein by reference in its entirety.

The liner system in one embodiment may comprise a liner 60 attached to the inner surfaces 63 of the fuel pool sidewalls 41 and the base slab 42. The inside surface 61 of liner is contacted and wetted by the fuel pool water W. The liner 60 may be made of any suitable metal of suitable thickness T2 which is preferably resistant to corrosion, including for example without limitation stainless steel, aluminum, or other. Typical liner thicknesses T2 may range from about and including 3/16 inch to 5/16 inch thick. Typical stainless steel liner plates include ASTM 240-304 or 304L.

In some embodiments, the liner 60 may be comprised of multiple substantially flat metal plates or sections which are hermetically seal welded together via seal welds along their contiguous peripheral edges to form a continuous liner system completely encapsulating the sidewalls 41 and base slab 42 of the fuel pool 40 and impervious to the egress of pool water W. The liner 60 extends around and along the vertical sidewalls 41 of the fuel pool 40 and completely across the horizontal base slab 42 to completely cover the wetted surface area of the pool. This forms horizontal sections 60b and vertical sections 60a of the liner to provide an impervious barrier to out-leakage of pool water W from fuel pool 40. The horizontal sections of liners 60b on the base slab 42 may be joined to the vertical sections 60a along perimeter corner seams therebetween by hermetic seal welding. The liner 60 may be fixedly secured to the base slab 42 and sidewalls 41 of the fuel pool 40 by any suitable method such as fasteners.

Referring now to FIGS. 2-6, a perspective view of a fuel rack 100 according to one embodiment of the present invention is disclosed. The fuel rack 100 is a cellular, upright, prismatic module. Fuel rack 100 may be a high density, tightly packed non-flux type rack as illustrated which is designed to be used with fuel assemblies that do not require the presence of a neutron flux trap between adjacent cells 110. Thus, the inclusion of neutron flux traps (e.g. gaps) in fuel racks when not needed is undesirable because valuable fuel pool floor area is unnecessarily wasted. Of course, both non-flux and flux fuel rack types may be stored side by side in the same pool using the seismic-resistant fuel storage system according to the present disclosure. The invention is therefore not limited to use of any particular type of rack.

Fuel rack 100 defines a vertical longitudinal axis LA and comprises a grid array of closely packed open cells 110 formed by a plurality of adjacent elongated tubes 120 arranged in parallel axial relationship to each other. The rack comprises peripherally arranged outboard tubes 120A which define a perimeter of the fuel rack and inboard tubes 120B located between the outboard tubes. Tubes 120 are coupled at their bottom ends 114 to a planar top surface of a baseplate 102 and extend upwards in a substantially vertical orientation therefrom. In this embodiment, the vertical or central axis of each tube 120 is not only substantially vertical, but also substantially perpendicular to the top surface of the baseplate 102. In one embodiment, tubes 120 may be fastened to baseplate 102 by welding and/or mechanical coupling such as bolting, clamping, threading, etc.

Tubes 120 include a top end 112, bottom end 114, and a plurality of longitudinally extending vertical sidewalls 116 between the ends defining a height H1. Each tube 120 defines an internal cavity 118 extending longitudinally between the top and bottom ends 112, 114. In the embodiment shown in FIG. 2A-B, four tube sidewalls 116 arranged in rectilinear polygonal relationship are provided forming either a square or rectangular tube 120 in lateral or transverse cross section (i.e. transverse or orthogonal to longitudinal axis LA) in plan or horizontal view (see also FIG. 3). Cells 110 and internal cavities 118 accordingly have a corresponding rectangular configuration in lateral cross section. The top ends of the tubes 120 are open so that a fuel assembly can be slid down into the internal cavity 118 formed by the inner surfaces of the tube sidewalls 116. Each cell 110 and its cavity 118 are configured for holding only a single nuclear fuel assembly 28.

It will be appreciated that each tube 120 can be formed as a single unitary structural component that extends the entire desired height H1 or can be constructed of multiple partial height tubes that are vertically stacked and connected together such as by welding or mechanical means which collectively add up to the desired height H1. It is preferred that the height H1 of the tubes 120 be sufficient so that the entire height of a fuel assembly may be contained within the tube when the fuel assembly is inserted into the tube. The top ends 112 of tubes 120 may preferably but not necessarily terminate in substantially the same horizontal plane (defined when perpendicular to longitudinal axis LA) so that the tops of the tube are level with each other. The baseplate 102 at the bottom ends 114 of the tubes defines a second horizontal reference plane HR.

Figure 2A:
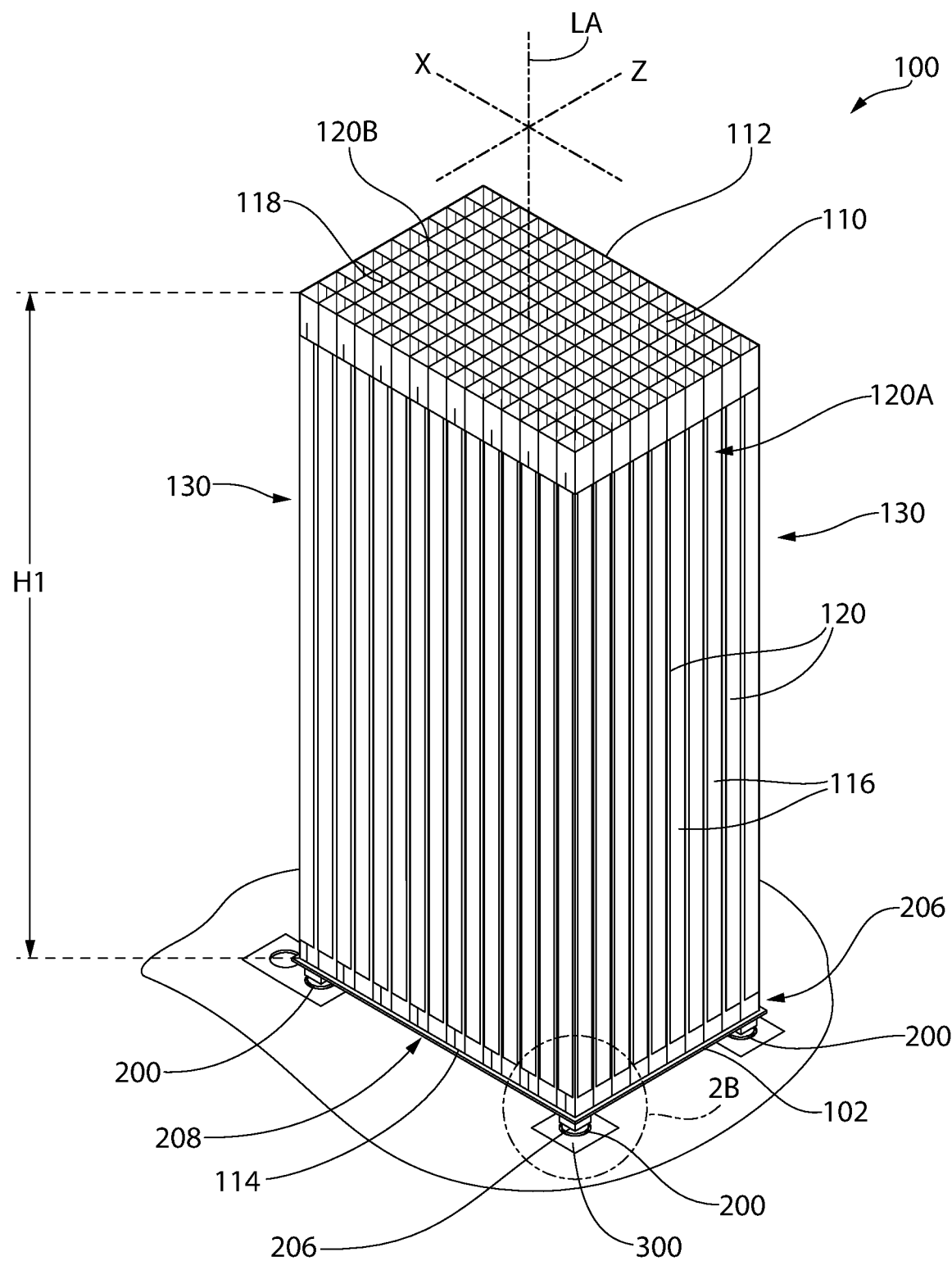
FIG. 2A is a perspective view of a nuclear fuel storage system for a fuel pool according to the present disclosure.
Figure 2B:
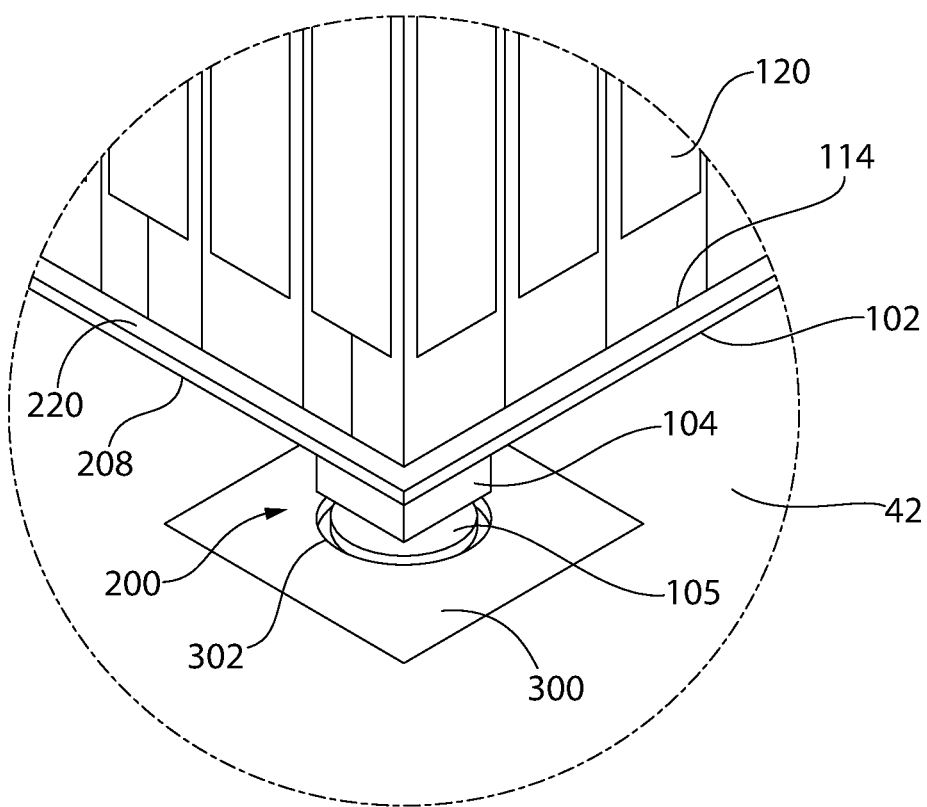
FIG. 2B is a detail taken from FIG. 2A.

As best shown in FIGS. 2A-B, tubes 120 are geometrically arranged atop the baseplate 102 in rows and columns along the Z-axis and X-axis respectively. Any suitable array size including equal or unequal numbers of tubes in each row and column may be provided depending on the horizontal length and width of the pool base slab 42 and number of fuel racks 100 to be provided. In some arrangements, some or all of the fuel racks 100 may have unequal lateral width and lateral length as to best make use of a maximum amount of available slab surface area as possible for each installation.

For convenience of reference, the outward facing sidewalls 116 of the outboard tubes 120A may be considered to collectively define a plurality of lateral sides 130 of the fuel rack 100 extending around the rack's perimeter as shown in FIGS. 2A-B.

Tubes 120 may be constructed of any suitable material usable in a nuclear fuel storage rack. In one embodiment, without limitation, the tubes may be formed of a metal-matrix composite material, and preferably a discontinuously reinforced aluminum/boron carbide metal matrix composite material, and more preferably a boron impregnated aluminum. One such suitable material is sold under the tradename Metamic™. The tubes 120 perform the dual function of reactivity control as well as structural support. Advantageously, tube material incorporating the neutron absorber material allows a smaller cross sectional (i.e. lateral or transverse to longitudinal axis LA) thickness of tube sidewalls 116 thereby permitting tighter packing of cells allowing for a greater number of cells per fuel rack to be provided. The baselate 102 is preferably constructed of a metal that is metallurgically compatible with the material of which the tubes 120 are constructed to facilitate welding.

Referring to FIGS. 2-6 (inclusive of all alphabetic sub-parts), each fuel rack 100 comprises a plurality of legs or pedestals 200 which support rack from the base slab 42 of the fuel pool 40. Pedestals 200 each have a preferably flat bottom end 204 to engage the pool base slab 42 and a top end 202 fixedly attached to the bottom of the baseplate 102. The pedestals 200 protrude downwards from baseplate 102. This elevates the baseplates 102 of the rack off the base slab 42, thereby forming a gap therebetween which defines a bottom flow plenum P beneath rack 100. The plenum P allows cooling water W in the pool to create a natural convective circulation flow path through each of the fuel storage tubes 120 (see e.g. flow directional arrows in FIG. 5). A plurality of flow holes 115 are formed in the rack through baseplate 102 in a conventional manner to allow cooling water to flow upwards through the cavity 118 of each tube 120 and outward through the open top ends 112 of the tubes. Commonly owned U.S. patent application Ser. No. 14/367,705 filed Jun. 20, 2014 shows fuel rack baseplates with flow holes, and is incorporated herein by reference in its entirety. The pool water W flowing through the tubes is heated by the nuclear fuel in fuel assemblies, thereby creating the motive force driving the natural thermal convective flow scheme.

Figure 5:
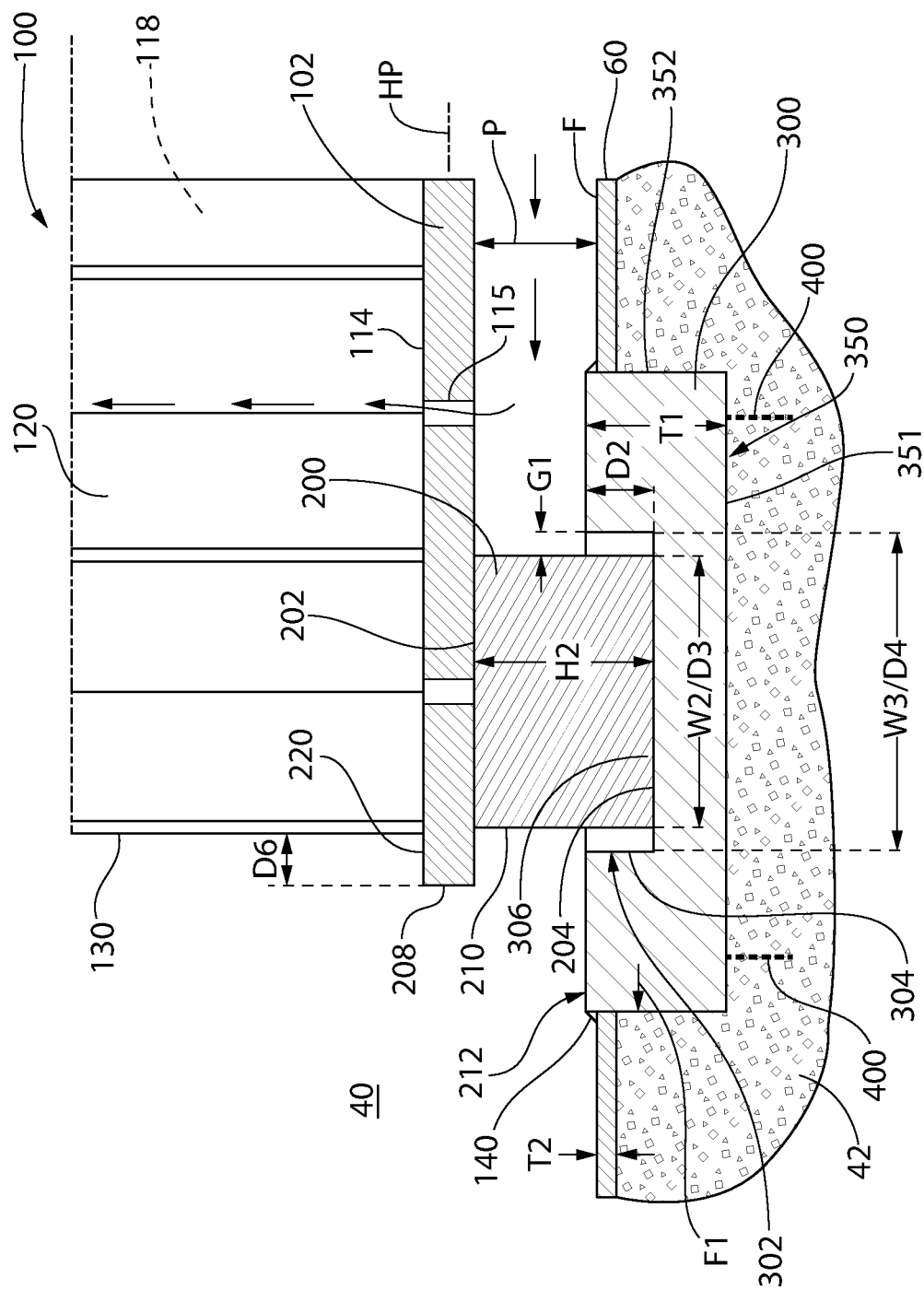
FIG. 5 is a detailed side elevation view showing a fuel rack support leg or pedestal embedment system configured for damage mitigation between two adjacent fuel racks in the fuel pool during a seismic event.

Referring now then to FIGS. 3 and 5, flow holes 115 create passageways from below the base plate 102 into the cells 110 formed by the tubes 120. Preferably, a single flow hole 115 is provided for each cell 110, however, more may be used as needed to create sufficient flow through the tubes. The flow holes 115 are provided as inlets to facilitate natural thermosiphon flow of pool water through the cells 110 when fuel assemblies having a heat load are positioned therein. More specifically, when heated fuel assemblies are positioned in the cells 110 in a submerged environment, the water within the cells 110 surrounding the fuel assemblies becomes heated, thereby rising due to decrease in density and increased buoyancy creating a natural upflow pattern. As this heated water rises and exits the cells 110 via the tube open top ends 112 (see FIG. 1), cooler water is drawn into the bottom of the cells through the flow holes 115. This heat induced water flow and circulation pattern along the fuel assemblies then continues naturally to dissipate heat generated by the fuel assemblies Pedestals 200 may therefore have a height H2 selected to form a bottom flow plenum P of generally commensurate height to ensure that sufficient thermally-induced circulation is created to adequately cool the fuel assembly. In one non-limiting example, height H2 of the plenum P may be about 2 to 2.5 inches (including the listed values and those therebetween of this range).

Figure 1B:
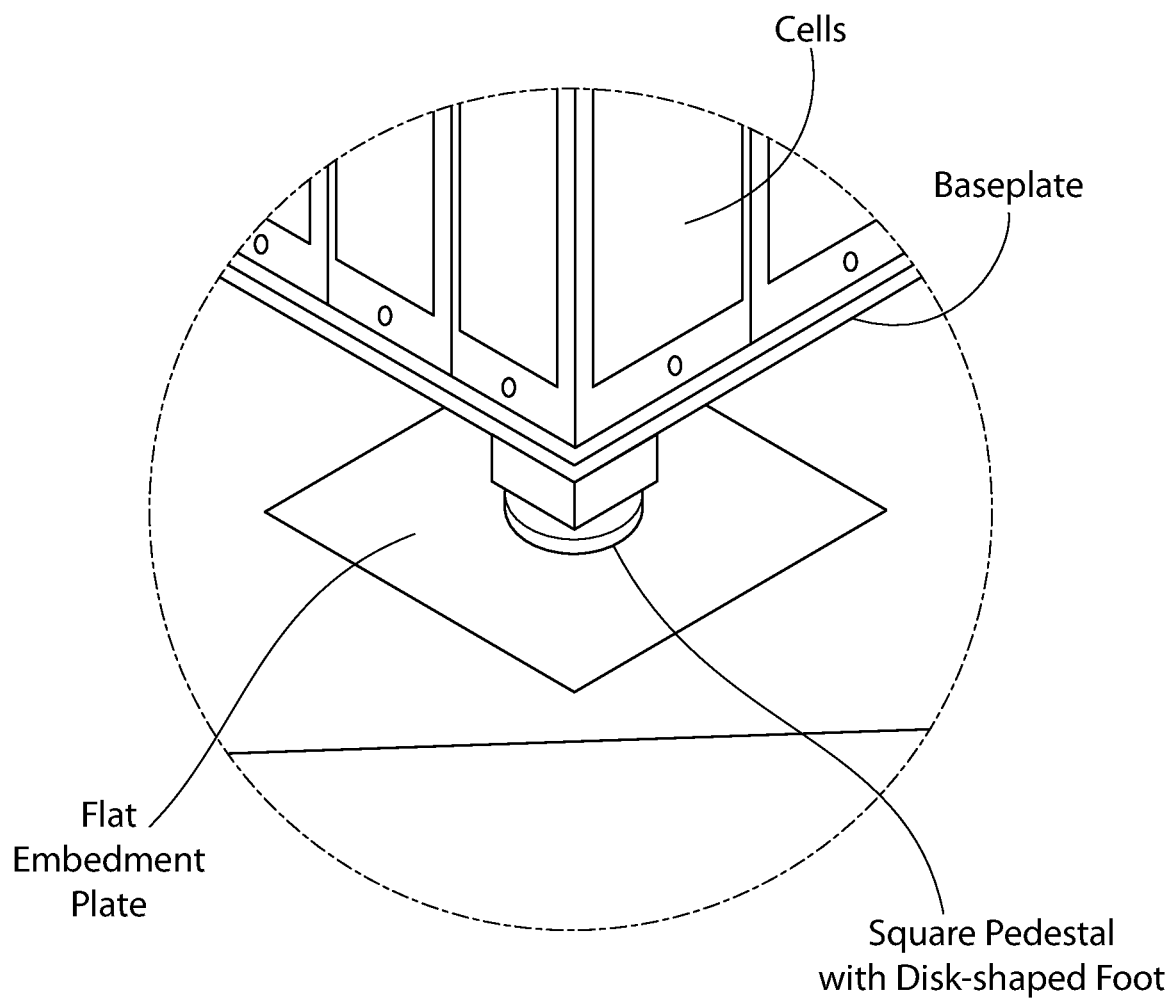
FIG. 1B is a detail taken from FIG. 1A.
Figure 4:
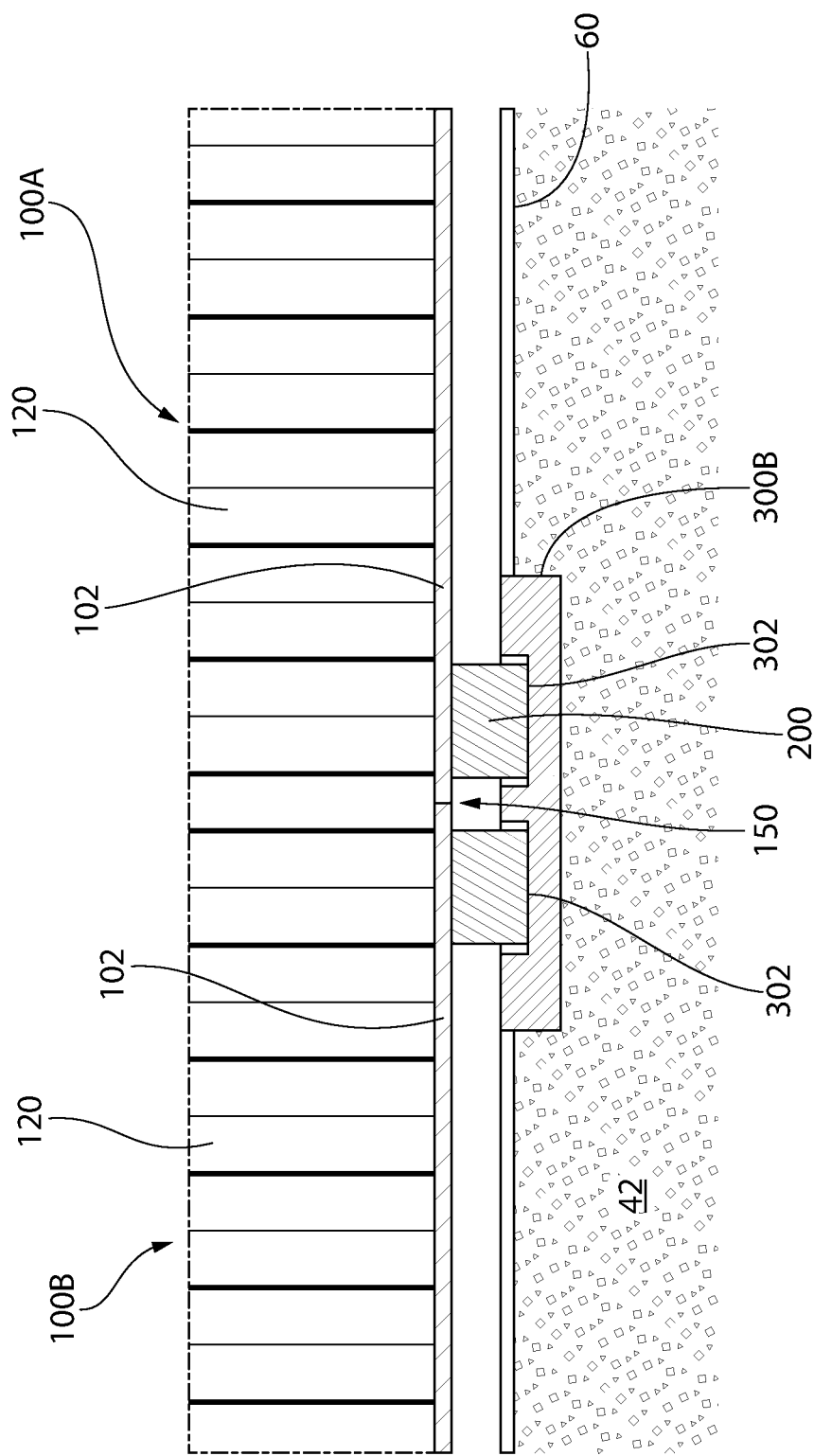
FIG. 4 is a side cross sectional view showing a baseplate edge contact system configured for damage mitigation between two adjacent fuel racks in the fuel pool during a seismic event.

Pedestals 200 may have any suitable configuration or shape and be of any suitable type. Some non-limiting examples of shapes that may be used include rectangular or square with a rectilinear lateral/transverse cross sectional shape, cylindrical with a circular cross sectional shape, polygonal with a polygonal cross sectional shape, non-polygonal with a non-polygonal cross sectional shape, or combinations thereof. One combination shown in FIG. 1 is a fixed height pedestal including a rectangular upper portion attached to the fuel rack baseplate 102 and enlarged cylindrical disk-shaped lower portion forming a circular cylindrical foot pad for engaging the fuel pool 40 in a stable manner. FIGS. 2A and 2B show an adjustable pedestal 200, as further described herein. FIGS. 4 and 5 show a fixed height pedestal 200 which may have any of the foregoing mentioned shapes or others.

It should be noted that the pedestals 200 described herein for a seismic-resistant fuel rack storage system according to the present disclosure are configured for a "free standing" fuel rack 100 as described in the Background (i.e. no provisions such as holes for use in in providing fasteners to affix the pedestals and fuel racks to the bottom of the fuel pool).

Pedestals 200 preferably may be made of a corrosion resistant metal of suitable dimension and thickness to provide the strength necessary to adequately support the weight of the fuel assemblies 28 and storage tubes 120 supported by the baseplate 102. Each fuel rack 100 may include a plurality of peripheral pedestals 200 spaced apart and arranged along the peripheral edges and perimeter of the baseplate 102, and optionally one or more interior pedestals if required to provide supplemental support for the inboard fuel assemblies and tubes 120B. In one non-limiting embodiment, four peripheral pedestals 200 may be provided each of which is located proximate to one of the four corners 206 of the baseplate. Additional peripheral pedestals may of course be provided as necessary between the corner pedestals on the perimeter of the baseplate. The pedestals are preferably located as outboard as possible proximate to the peripheral edges 208 of the baseplates 102 of each fuel rack or module to give maximum rotational stability to the modules.

With continuing reference to FIGS. 2-6, a seismic resistant nuclear fuel storage rack system further comprises a plurality of specially-configured embedment plates 300 fixedly coupled to the base slab 42 of the fuel pool 40 for engaging the fuel rack pedestals 200. Accordingly, the embedment plates 300 are not movable in relation to the base slab 42 or pool adjoining pool liner 60. Embedment plates 300 are arranged in a laterally spaced apart pattern around the pool base slab 42 and each is positioned to coincide with the location of at least one of the fuel rack pedestals 200. This forms a discontinuous pedestal support system in which no two embedment plates 300 are in contact with each other in certain embodiments. The pool liner 60 is interspersed and extends between the embedment plates in one embodiment. The embedment plates 300 each have a smaller lateral dimension in all directions that the than the fuel racks 100 or sections of the liner.

The laterally spaced apart embedment plates 300 are each hermetically seal welded together via seal welds 140 along all of their peripheral lateral sides as shown in FIG. 5 to form a continuous hermetically-sealed liner system completely encapsulating the base slab 42 of the fuel pool 40. In one configuration, the embedment plates 300 may protrude upwards beyond a top surface (floor F) of adjacent portions of the pool liner 60 as shown in FIG. 5 to facilitate forming fillet welds around the entire perimeter of the embedment plate to the liner. Other arrangements and types of welds are possible. The hermetically seal-welded embedment plates 300 and bottom sections of liner 60 thus collectively form a pool bottom which is an impervious barrier to out-leakage of pool water W through the base slab from fuel pool 40.

The embedment plates 300 include a preferably flat top wall 212 defining a top surface and have suitable thickness to support a pedestal 200 and a portion of the total dead weight of the fuel rack seated thereon. In the illustrated and preferred embedment, the embedment plates 300 are preferably fixedly attached and anchored directly to the base slab 42 of the fuel pool 40 independently of the liner 60 and without any intervening structures therebetween (best shown in FIGS. 4 and 5). There is no relative movement between the embedment plates 300 and the pool liner 60 or base slab 42. This ensures optimal anchoring and stabilization of the embedment plates 300 to the pool's base slab 42 during of a seismic event (e.g. earthquake) such that the embedment plates cannot slide or move with respect to the base slab or liner 60. This also ensures that horizontally-directed lateral forces F1 produced by a seismic event and the vertical dead weight of a completely filled fuel rack 100 are transmitted directly to the steel-reinforced (e.g. rebar) base slab 42 of the fuel pool 40 without transferring lateral or vertical forces to and adversely affecting the integrity of the liner 60. This permits the liner 60 to be thinner than the embedment plate 300 and designed for only the non-load bearing function of the pool water containment. Due to the structural nature and load bearing function of the embedment plates 300, the plates preferably have a substantially greater thickness T1 than the pool liner 60 thickness T2 (see, e.g. FIG. 5) such as for example at least twice the thickness T2. Embedment plate 300 may have a minimum thickness of 1 inch or more.

Each embedment plate 300 may be received in a complementary-configured upwardly open anchorage recess 350 including a bottom 351 and vertically extending sidewalls 352. A conformal fit is preferably provided if possible between the embedment plates 300 and anchorage recess 350 such that the material of fuel pool's concrete base slab 42 on the bottom and sidewalls of the recess 350 is in intimate conformal contact with bottom and sides of the embedment plate (see, e.g. FIG. 5). This can be readily achieved if the embedment plates 300 are installed before the concrete for the base slab is poured, or if concrete grout is added in gaps around the perimeter of the plates 300 between the sides of the plate and sidewalls 352 of a slightly enlarged recess. In any of these construction scenarios, laterally and horizontally acting seismic loads or forces F1 acting on the embedment plate created by engagement between shifting pedestals 200 and sidewalls 204 of the embedment cavity 302 (described below) are laterally transferred directly to the base slab 42 via the vertical sidewalls 352 of the slab contacting the sides of embedment plate 300 without transferring these loads or forces to the thinner less structurally robust pool liner 60 which could otherwise result in damage to and compromise the leak-proof integrity of the pool liner system.

Alternatively in some embodiments, if embedment plates 300 are added after the base slab 42 is poured and the perimeter concrete grouting is not added as described above, a minimal appreciable gap preferably should be provided between the sides of the embedment plates 300 and the sidewalls 352 of the recess 350 to allow formation of the perimeter seal welds 140 describe elsewhere herein between the plates and pool liner 60. In addition, one or more through anchors 400 similar to those shown in FIG. 14 and further described herein (represented in dashed lines in present FIG. 5) preferably should be added for anchoring the embedment plate 300 through the bottom 351 of the anchorage recesses 350 into the concrete base slab 42 beneath the embedment plates. Laterally acting seismic loads or forces F1 in this configuration will then be transferred from the embedment plates 300 through anchors 400 into the base slab 42 so that none of these seismic forces are transmitted to the thinner pool liner 60 to protect the integrity of the liner system.

To minimize sliding engagement and impact loads between adjacent fuel racks 100 during a seismic event which may damage the racks and fuel storage tubes 120, each embedment plate 300 includes at least one engineered recessed receptacle or cavity 302 configured to capture and engage a pedestal 200 of the fuel rack 100. Each embedment cavity 302 is configured (i.e. shaped and dimensioned) to receive and abuttingly engage the terminal bottom end 204 of a pedestal 300 to restrain lateral/horizontal movement of the pedestal during a seismic event. This is best shown in FIGS. 4 and 5. Each cavity 302 is collectively defined by a flat bottom wall 306 defining a vertically upward facing horizontal bearing surface for engaging the bottom end of a pedestal 200 and plurality of preferably flat sidewalls 304 extending upwards therefrom at a right angles and defining inward facing vertical bearing surfaces for engaging the sides of a pedestal. The cavities 302 have an open top for receiving the pedestals 200 of the fuel racks 100 when they are emplaced in the fuel pool 40.

Preferably each embedment plate cavity 302 may be located in the central region of the embedment plate 300 such that a portion of the top wall 212 and surface completely circumscribes and surrounds the cavity on all sides (see, e.g. FIGS. 4-5 and 7-12). This arrangement ensures that portions of the embedment plate 300 surrounding cavity 302 have adequate structural strength to withstand lateral impacts forces acting against the sidewalls 304 of the cavity in a horizontal direction due to impact by a sliding pedestal 200 during a seismic event.

Each embedment plate cavity 302 has a depth D2 selected to receive and entrap or restrain a sufficient lower portion of the pedestal 200 within the confines of the cavity. A proper cavity depth D2 may be selected by weighing the competing interests of keeping the pedestal as short as possible to resist cantilevered bending moments imparted to the pedestals during a seismic event on one hand (recognizing that a lower portion of the pedestal will extend in the embedment plate cavity below the floor F of the pool bottom defined by the top surface of the pool liner 60), and maintaining a bottom flow plenum P of adequate height to induce the needed amount of natural thermal pool water circulation through the fuel rack 100 on the other hand to cool the fuel. The depth D2 must also be sufficiently deep enough so that the pedestals 200 do not "jump" out of the cavities during shaking caused the seismic event. In one non-limiting example, depth D2 of the embedment cavity 302 may preferably be about 1-3 inches, more preferably about 1-2 inches, and most preferably about 1-1.5 inches (including the listed values and those therebetween of these ranges).

The embedment plate cavities 302 each further have a complementary configuration to the transverse or lateral cross sectional shape of the pedestal 200. Each cavity 302 is preferably sized minimally larger in the lateral or horizontal dimensions than the comparable width or diameter of the pedestal to minimize the amount of lateral movement permitted for the pedestals, and hence the entire fuel rack 100. The maximum transverse cross sectional dimension of lower portion of the pedestal 200 that fits within the cavity 302 may be considered to define a transverse width W2 or diameter D3 as applicable depending on the shape of the lower portion (e.g. rectilinear, polygonal, circular, etc.). The nomenclature used is not important and merely descriptive of this maximum transverse dimension. In a similar vane, depending on transverse cross sectional shape of the embedment cavity 302, the cavity may be defined as having a transverse width W3 or diameter D4. In one embodiment, cavity 302 preferably without limitation may have a maximum transverse cross sectional dimension (e.g. width W3 or diameter D4) which is no more than 5-50% larger (including or therebetween these percentages) than the maximum transverse cross sectional dimension (e.g. width W2 or diameter D3) of the pedestal 200, and more preferably no more than 10-30%. Considered another way, the physical annular clearance or gap G1 formed between the pedestal 200 and the sidewalls 304 of embedment cavity 302 (measured from the maximum transverse cross sectional dimension of the lower portion of the pedestal to the sidewall) preferably may be no more than 0.5-4 inches (including or therebetween these distances), and more preferably no more than 0.5-2 inches. Preferably, the gap G1 is less than ½ the maximum transverse cross sectional dimension (W2/D3) of pedestal 200, more preferably less than ⅓, and most preferably less than ¼ that maximum transverse cross sectional dimension of the pedestal. The maximum transverse dimension of the embedment cavity 302 preferably is as small as possible from a practical standpoint allowing enough clearance for insertion of the lower portion of each pedestal 200 into the cavity when maneuvering the fuel rack 100 via an overhead crane which is typically the method used to emplace or remove fuel racks from the fuel pool 40.

In operation, pedestals 200 of the fuel rack 100 are each non-fixedly seated in a cavity 302 of an embedment plate 300 as shown in FIGS. 2A-B, 4, and 5. During a seismic event, the fuel rack 100 will tend to be moved laterally and horizontal by the event. When the frictional interactive force between the bottom end 204 of the pedestal 200 and the bottom wall 306 of the cavity surfaces is exceeded, the fuel rack and pedestals will start to slide laterally/horizontally across the cavities of the embedment plates. If movement is sufficient, the lateral sides 210 of the pedestals 200 which define a first bearing surface will abuttingly engage the sidewalls 304 of the cavity 302 which define a second bearing surface. The pedestals are thus entrapped by the mutual engagement to prevent any further lateral/horizontal movement of the fuel rack to prevent or minimize impact forces between adjacent fuel racks 100. In some embodiments where possible, the sides 210 of at least the lower portion of the pedestals 200 inserted within the embedment plate cavities 302 are configured to be parallel in orientation to the sidewalls 304 of the cavities to maximize the contact area between the colliding bearing surfaces.

In some embodiments, at least all the outboard/exterior perimeter or peripheral pedestals 200 at the edges of the fuel rack baseplates 102 are preferably received in a corresponding embedment plate cavity 302 which is sufficient to restraint lateral/horizontal movement of the fuel rack 100 during a seismic event. Any inboard/interior pedestals that may be provided to support the central regions of the fuel racks may optionally be constrained from movement via engagement with embedment plate cavities, but need not necessarily be so constrained. Such inboard/interior pedestals may therefore be engaged by a conventional flat embedment plate without a cavity.

Figure 12:
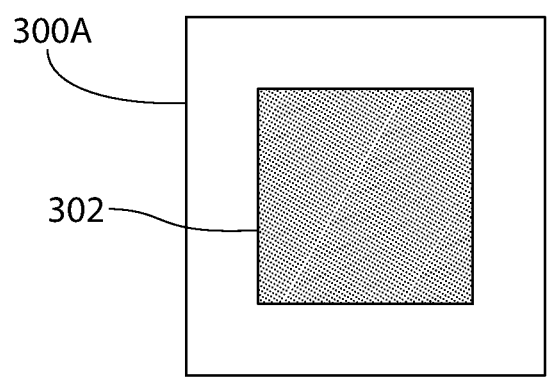
FIG. 12 is a top plan view of a fourth embedment plate.

Various configurations of embedment plates 300 may be provided depending on the layout of fuel racks 100 in the fuel pool 40. Each seismic resistant embedment plate 300 includes at least one embedment cavity 302 as shown in FIGS. 5, 7, and 12 for example. In a typical fuel pool, the fuel racks 100 are tightly spaced so that at least the corner regions of two or more fuel racks are located proximate to each other as shown in FIG. 3 which is a top plan view of an example fuel pool 40. The vertically lateral sides 130 and upwardly exposed baseplate protruding ledges 220 described herein between adjacent fuel racks are marked (numbered) and appear as double parallel lines to discern the outlines of each fuel rack. The lateral sides 130 of perimeter or peripheral fuel racks in the pool appear as a single line where they lie adjacent to the fuel pool sidewalls 41.

At some locations in the fuel pool 40, economies and stability of installation may be achieved by providing a single larger embedment plate 300 having multiple pedestal-restraint cavities 302 for capturing two or more pedestals 200 from two or more fuel racks 100. Non-limiting examples of such embedment plates with multiple cavities are shown in FIGS. 8 and 9 to illustrate the concept. Each cavity 302 is spatially separated from another cavity on the same embedment plate 300 so that a portion of the plate top wall 212 lies between the cavities as shown. The cavities 302 are spaced apart by a suitable distance to account for the dimensions of the adjacent fuel racks 100 and their pedestal 200 locations in accordance with principles of the present disclosure.

In FIG. 3, embedment plates 300 are marked by an "X" which would generally coincide of course with the location of one or more pedestals engaging the embedment plates 300 and their cavities 302. As an illustrative example, a cluster of six adjacent fuel racks 100A, 100B, 100C, 100D, 100E, and 100F have been labelled for explanation. A single-cavity embedment plate 300A (e.g. FIG. 7 or 12) is shown in each sidewall 41 corner region 44 of the fuel pool 40 which has a single embedment or restraint cavity 302 configured to receive a single corner pedestal 200 of racks 100A and 100C, for example. A double-cavity embedment plate 300B (e.g. FIGS. 4 and 8) is located along the sidewall 41 of the fuel pool at the perimeter interface or intersection between two adjacent fuel racks 100A and 100B, 100B and 100C, 100C and 100D, and 100A and 100F. A quadruple-cavity embedment plate 300C (e.g. FIG. 9) is located in the interior region of the fuel pool where the corners of four fuel racks meet, such as at the corner interface or intersection between fuel racks 100A, 100B, 100E, and 100F, and racks 100B, 100C, 100D, and 100E. It will be appreciated that the cavities in each multi-cavity embedment plate 300B or 300C do not all have to be of the same shape and will depend on the shape of the fuel rack pedestal 200 to be received in each cavity. FIG. 9, as an example without limitation, shows an embedment plate 300C having three circular cavities 302 and one rectilinear (e.g. square) cavity 302. Accordingly, numerous variations of embedment plates and embedment cavities are possible depending on the design of the fuel racks and their pedestal cross sectional shapes to be accommodated.

In FIG. 3, examples of interior or inboard pedestals 200A of each fuel rack 100 are illustrated. These interior pedestals preferably engage a mating embedment plate 300D, which may include a pedestal-restraint cavity 302 or alternatively may be a completely flat conventional embedment plate without any top recesses for inserting the pedestal 200A. As described elsewhere herein, providing the exterior or outboard pedestals of the fuel racks with mating embedment plates 300 having cavities is sufficient to restrain movement of the fuel racks in all horizontal/lateral directions in the event of a seismic occurrence. In the fuel racks shown in FIG. 3, each rack has four exterior corner pedestals for example (other possible embodiments of larger fuel racks may have intermediate exterior pedestals between the corner pedestals).

The embedment plates 300 are preferably formed of a suitable corrosion resistant metal of suitable strength such as without limitation stainless steel, aluminum, or another metal. The metal selected may optionally be selected to be compatible for welding to the type of metal used to construct the pool liner 60 without requiring dissimilar metal welding which facilitates installation.

According to another aspect of a seismic resistant fuel pool with reference to FIGS. 4-6, the fuel racks 100 may each be configured so that their baseplates 102 protrude horizontally and laterally outwards for a distance D6 beyond the vertical lateral sides 130 of the racks, thereby creating a protruding peripheral ledge 220. Ledge 220 may circumscribe and extend completely around the entire perimeter of the fuel rack 100 to protect the lateral sides of each rack (e.g. tube sidewalls 116) from damage during a seismic event. Each pedestal may be of a predetermined fixed height, shimmed at the bottom if necessary, so that the baseplates 102 of all fuel racks or modules are essentially coplanar falling within the same horizontal plane HP (referenced in FIG. 5). During a seismic event, this positioning of baseplates substantially within the same horizontal plane (recognizing installation tolerances) and the set-back or offset distance D6 of the tube sidewalls 116 from baseplate peripheral edges 208 advantageously protects the cells 110 from damage ensuring that any contact between adjacent sliding fuel racks occurs between the peripheral edges of the racks alone. Typical offset distances D6 used may be for example without limitation 1-3 inches. Larger or smaller offset distances may be used in other embodiments.

Alternatively, an adjustable pedestal configuration may be used to avoid the need for shims. Such adjustable pedestals typically equipped with a two-piece threaded leg or pedestal for making vertically height adjustments are well known in the art. FIGS. 2A and 2B show an example of an adjustable pedestal design. These adjustable height pedestals 200 are connected to the bottom surface of the baseplate 102. In one embodiment, for example without limitation, the adjustment means may be accomplished via a threaded pedestal assembly. The adjustable height pedestals 200 ensure that a space exists between the base slab 42 of the fuel pool 40 and the bottom surface of the base plate 102, thereby creating an inlet plenum P for water to flow upwards through the flow holes 115 and cells 110 as describe elsewhere herein.

The adjustable height pedestals 200 are spaced to provide uniform support of the base plate 102 and thus the fuel rack 100. Each such pedestal 200 is preferably individually adjustable to level and support the fuel rack on a non-uniform spent fuel pool base slab 42 surface, thereby avoiding the need for shims to ensure that the baseplates 102 of all fuel racks 100 are substantially coplanar. In one example of many possible configurations, the pedestals 200 may each comprise a block-shaped rectilinear upper mounting portion 104 affixed rigidly to the bottom surface of the fuel rack baseplate 102 and an adjustable lower base portion 105 threadably coupled to the mounting portion and moveable vertically with respect to thereto. The base portion 105 may be circular cylindrical in one embodiment as shown to provide a stable base pad for engaging bottom wall 306 of embedment plate cavity 302; however, other suitable shapes may be used. The pedestals mounting portion 104 may be bolted to the baseplate 102 in some embodiments. Of course, in other embodiments, the mounting portions 104 can be attached to baseplate 102 by other means, including without limitation welding or threaded attachment as just two examples.

In some embodiments, an additional measure may be provide according to another aspect of the invention that further minimizes or prevents the likelihood of damage between laterally sliding or moving fuel racks during a seismic event. The fuel racks 100 may be arranged on the base slab 42 of the fuel pool 40 such that the proximate facing and mating peripheral edges 208 between baseplates 102 (e.g. horizontal protruding ledges 220) of adjacent fuel racks 100 are placed in abutting mutual edge contact or engagement upon emplacement in the fuel pool under normal operating conditions prior to the occurrence of a seismic event. Such an edge contact arrangement with abutment joints 150 formed between mating baseplate peripheral edges 208 is shown for example in FIGS. 3, 4, and 6. FIG.

4 shows best shows first and second fuel racks 100A and 100B with baseplate abutment joint 150 therebetween.

The foregoing edge contact arrangement between baseplates 102 of adjoining fuel racks 100 advantageously precludes any substantial degree of movement between adjacent fuel racks into each other. This eliminates initial impact forces between adjoining baseplates caused lateral shifting of the fuel racks due to seismic activity because the baseplates are pre-engaged. Because of the pre-seismic event edge contact arrangement, the fuel racks 100 so coupled would laterally move or slide in unison together under seismic activity a distance to the point where the entrapped fuel rack pedestals 200 engage the embedment plate cavity walls 204. Advantageously, there is no differential movement of one fuel rack 100 with respect to adjoining fuel racks in the entire array of racks in the fuel pool 40 thereby eliminating any substantial damage to the racks.

It will be appreciated that because of metal fabrication tolerances, complete conformal contact although desirable may not be possible along the entire horizontal peripheral edge interface length between two abutting baseplates 102. A minimal gap of for example without limitation no more than ¼ inch is reasonably obtainable at those interspersed locations if any between the adjoining fuel rack baseplates 102 where complete abutting conformal contact might not be fully achieved due to metal fabrication limitations. Preferably, however, abutting conformal contact is achieved for a majority of the length of each abutment joint 150 between mutually engaged pairs of fuel rack baseplate peripheral edges 208 (whether the conformal contact is measured contiguously or dis-contiguously at intermediate lengths along the mating baseplates separated by minor non-conformal contact areas).

It bears noting that conformal contact between adjoining fuel rack baseplates may be used in some embodiments as an alternative to the embedment plate cavities 302 describe herein, or preferably in other embodiments in conjunction with the cavities to provide dual protection against fuel rack damage during a seismic event.

A process or method for seismic-resistant storage of nuclear fuel in a fuel pool will now be briefly described based on seismic resistant fuel storage system described herein. In one embodiment, the method may comprise transporting and staging a plurality of fuels racks 100 proximate to the fuel pool 40 in a nuclear facility for loading the racks into the pool. The first fuel rack 100 is lifted via a crane (not shown) or other suitable piece of lifting equipment and maneuvered over the fuel pool 40. The first fuel rack 100 is oriented so that the perimeter pedestals 200 are each vertically aligned with a corresponding embedment plate 300 on the base slab 42 of the pool. The next step is lowering the first fuel rack into the water-filled fuel pool and insertably engaging each of the pedestals of the first fuel rack with corresponding upwardly open embedment receptacles or cavities 302 formed in a plurality of embedment plates 300 already fixedly coupled to the base slab of the fuel pool. The bottom ends of the pedestals 200 are seated on the recessed bottom wall 306 of the cavities and the sidewalls 304 trap the pedestals therein. Lateral movement of the pedestals 200 and hence fuel racks along the base slab 42 during a seismic event is restricted by engagement between the pedestals and the sidewalls of the embedment cavities of the embedment plates.

After the first fuel rack is positioned in the fuel pool 40, the method may continue with lowering a second fuel rack 100 into the fuel pool, insertably engaging each of the pedestals 200 of the second fuel rack with corresponding upwardly open receptacles or cavities 302 formed in the plurality of embedment plates 300 fixedly coupled to the base slab 42 of the fuel pool, and abuttingly engaging a peripheral edge 208 of the baseplate 102 of the first fuel rack with an adjoining peripheral edge of the baseplate of the second fuel rack. The baseplates 102 of the first and second fuel racks are substantially coplanar as already described herein to ensure mutual engagement. In some situations, at least one pedestal 200 of the second fuel rack 100 and at least one pedestal of the first rack may be engaged with separate receptacles formed in a single shared embedment plate, such as without limitation embedment plates 300B or 300C shown in FIGS. 8 and 9, respectively. Numerous variations in the foregoing method are possible.

Figure 14:
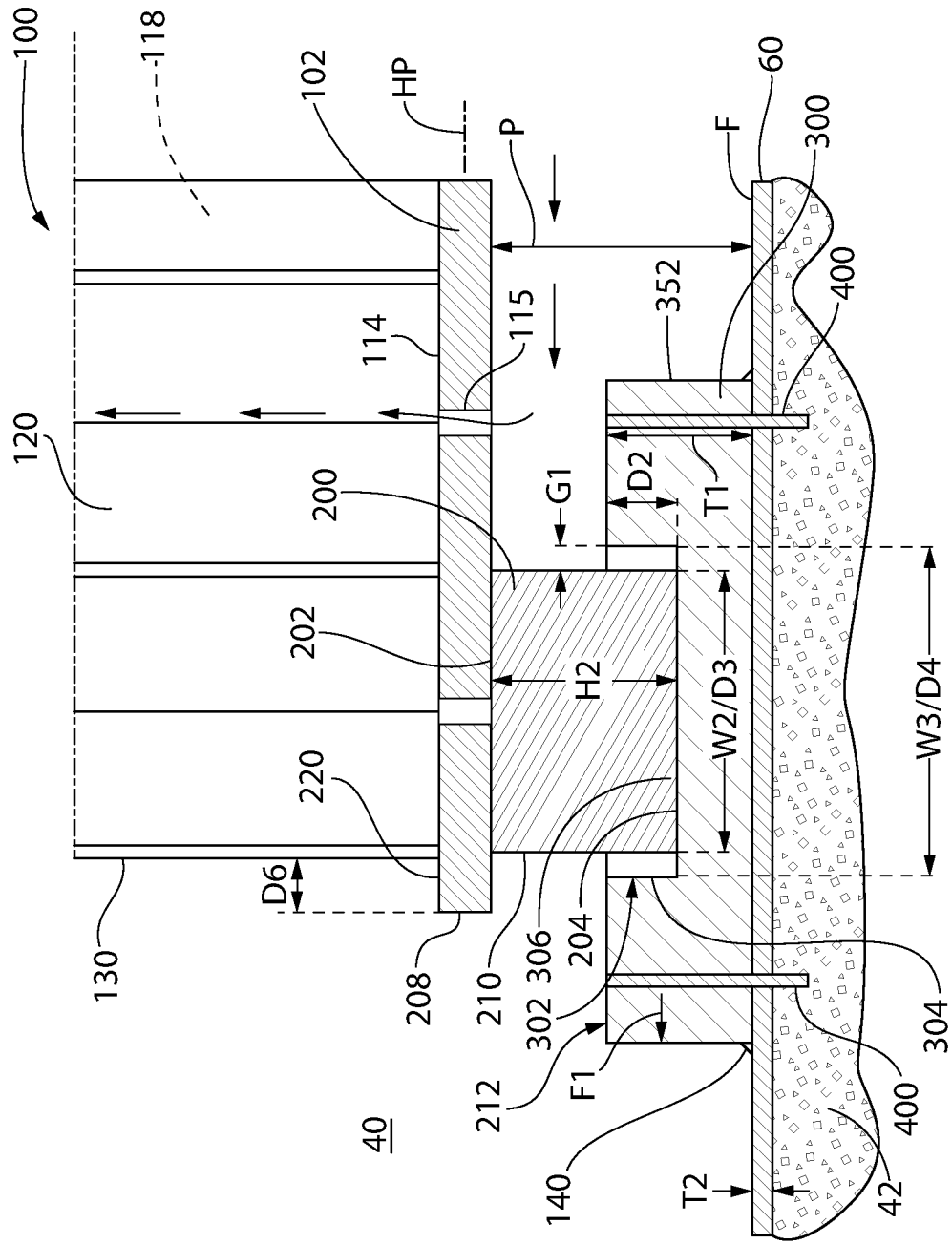
FIG. 14 is detailed side elevation view showing an alternative arrangement of a fuel rack support pedestal embedment system.

FIG. 14 shows an alternative embodiment of an embedment plate system in which embedment plates 300 are anchored to the base slab 42 of the fuel pool 40 through the pool liner 60 plate interposed therebetween. The bottom surface of the embedment plate 300 is seated directly on the top surface of the pool liner 60. One or more through metal anchors 400 are provided which vertically extend completely through the embedment plates and liner 60 into base slab 42. In one embodiment, the anchors 400 may be threaded masonry fasteners such as lag bolts threadably secured at their bottom ends into the base slab 42 of fuel pool 40 and having an exposed enlarged head at the opposite end configured for engaging a tightening tool such as a wrench. Use of other types of anchors is of course possible. This embodiment similarly prevents any relative movement between the pool liner 60 and the embedment plates 300. Although direct embedment of the embedment plates 300 in the pool base slab 42 shown in FIG. 5 is preferred when possible, this embodiment is useful for retrofit installations where an embedment plate system according to the present disclosure is added to an existing fuel pool 40 having a liner 60. This eliminates the need to cutout the existing pool liner 60 at the embedment plate locations. The embedment plates 300 may be hermetically sealed welded to the liner 60 completely around their perimeters using fillet welds 140 in a similar manner to that already described herein.

Figure 15:
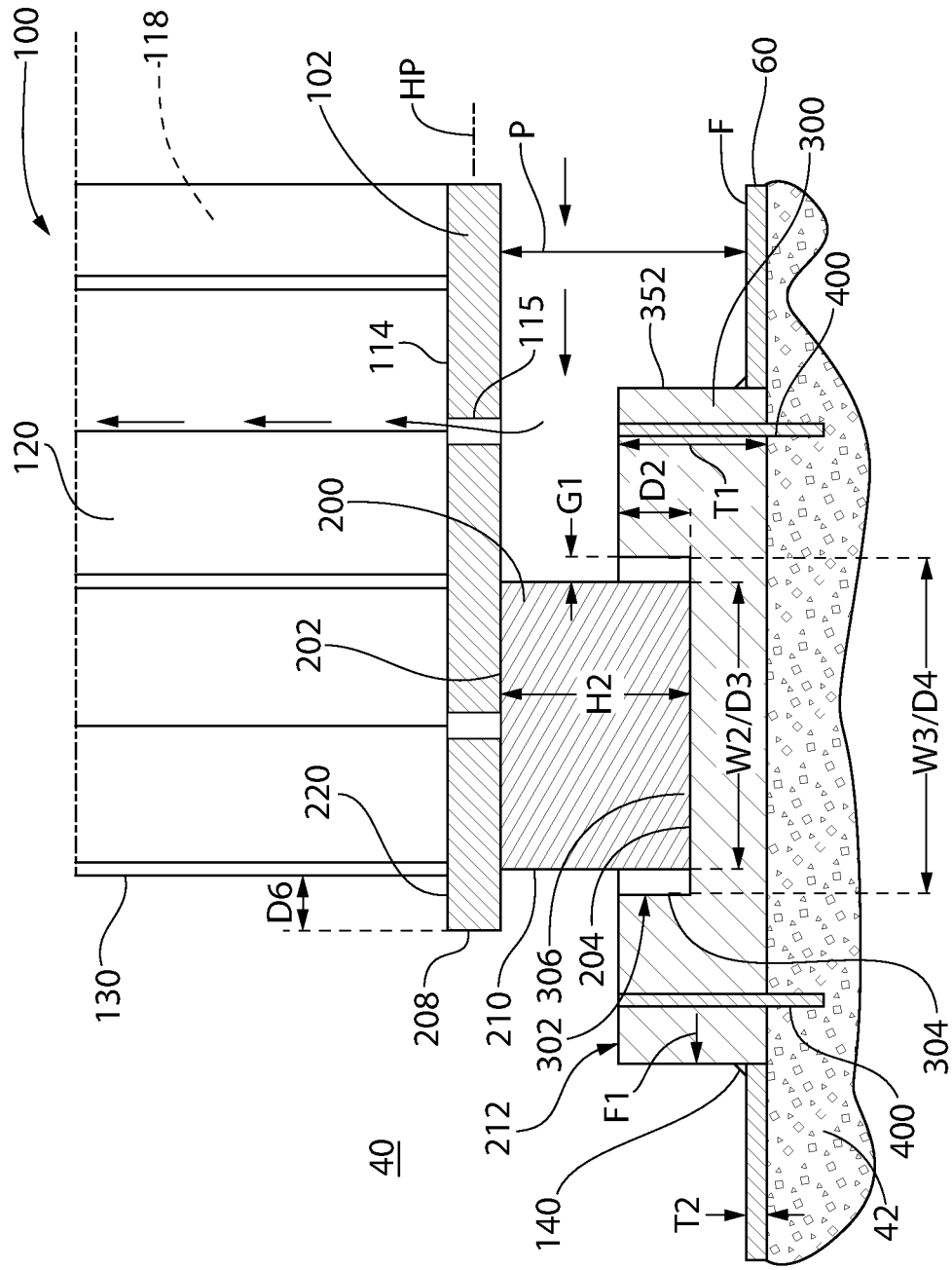
FIG. 15 is detailed side elevation view showing a second alternative arrangement of a fuel rack support pedestal embedment system.

FIG. 15 shows a second alternative embodiment of an embedment plate system in which embedment plates 300 are anchored directly to the base slab 42 of the fuel pool 40. In contrast to the embodiment of FIG. 14, in this embodiment no portion of the pool liner 60 plate is interposed between the embedment plate 300 and slab. The bottom surface of the embedment plate 300 is seated directly on the top surface of the base slab 42. One or more through metal anchors 400 are provided which vertically extend completely through the embedment plate into base slab 42. This embodiment similarly prevents any relative movement between the pool liner 60 and the embedment plates 300. The embedment plates 300 may be hermetically sealed welded to the liner 60 completely around their perimeters using fillet welds 140 in a similar manner to that already described herein.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A seismic-resistant nuclear fuel storage system comprising:
   a fuel pool comprising a base slab and plurality of vertical sidewalls collectively defining a cavity configured for wet storage of nuclear fuel;
   a fuel rack comprising a plurality of vertically elongated tubular cells each defining a prismatic cavity configured for storing nuclear fuel therein, the cells attached to a common baseplate;
   a plurality of pedestals attached to and protruding downwardly from the baseplate;
   a plurality of spaced apart embedment plates fixedly anchored to the base slab, each embedment plate comprising an upwardly open receptacle having receptacle walls defining a receptacle depth, each receptacle receiving and entrapping one of the pedestals therein;
   wherein the embedment plate receptacles are configured such that lateral movement of the fuel rack along the base slab in the event of a seismic event is constrained by engagement between the receptacle walls of each receptacle and the pedestals.

2. The fuel storage system according to claim 1, wherein the pedestals elevate the baseplate of the fuel rack above the base slab creating a bottom plenum to allow pool water to circulate beneath the fuel rack for cooling the nuclear fuel.

3. The fuel storage system according to claim 1, wherein the cells are formed by a plurality of upwardly open storage tubes fixedly attached to the baseplate and collectively defining lateral sides of the fuel rack.

4. The fuel storage system according to claim 3, wherein the baseplate protrudes horizontally outwards beyond the lateral sides of the fuel rack creating a protruding peripheral ledge that extends around a perimeter of the fuel rack.

5. The fuel storage system according to claim 1, wherein the receptacle depth is 1 to 2 inches deep.

6. The fuel storage system according to claim 1, wherein the receptacle is positioned in a central region of the embedment plate and surrounded by a flat top wall of the embedment plate.

7. The fuel storage system according to claim 1, wherein the embedment plate includes an upwardly open second receptacle spaced apart from the receptacle for receiving and entrapping a pedestal from a second fuel rack.

8. The fuel storage system according to claim 1, wherein a horizontal gap formed between the receptacle walls and lateral sides of the pedestal is less than ¼ of a maximum transverse cross sectional dimension of the pedestal.

9. The fuel storage system according to claim 1, further comprising a pool liner disposed on the base slab of the fuel pool beneath the fuel rack, the pool liner extending between the plurality of spaced apart embedment plates and having a thickness less than the embedment plate, wherein there is no relative movement between embedment plates and the pool liner in the event of a seismic event.

10. The fuel storage system according to claim 9, wherein the embedment plates are each hermetically seal welded around their perimeters to the pool liner at all lateral sides to form an impervious barrier to outward leakage of pool water from the fuel pool.

11. The fuel storage system according to claim 10, wherein the embedment plates protrude upwards beyond a top surface of adjacent portions of the pool liner around each embedment plate.

12. The fuel storage system according to claim 10, wherein the embedment plates are embedded directly into the base slab of the fuel pool such that there is no pool liner interposed between the embedment plates and the base slab.

13. The fuel storage system according to claim 10, wherein the embedment plates are each disposed on top of the pool liner and anchored to the base slab of the fuel pool by one or more through anchors extending from each embedment plate through the pool liner into the base slab.

14. A fuel rack stabilization system for seismic-resistant storage of nuclear fuel, the system comprising:
    a fuel pool comprising a base slab and plurality of vertical sidewalls collectively defining a cavity configured for submerged wet storage of nuclear fuel;
    a plurality of fuel racks supported on the base slab, each fuel rack comprising a plurality of vertically elongated tubes each defining a prismatic cavity configured for storing nuclear fuel therein, the tubes attached to a common baseplate;
    each fuel rack comprising a plurality of spaced apart pedestals protruding downwardly from the baseplate;
    a plurality of spaced apart embedment plates fixedly anchored to the base slab, each embedment plate comprising at least one upwardly open embedment cavity having cavity walls, the cavities each receiving and entrapping a respective one of the pedestals of the fuel racks therein;
    a pool liner secured to the base slab of the fuel pool, the pool liner extending between the plurality of spaced apart embedment plates and having a thickness measured between top and bottom surfaces of the pool liner less than a thickness of the embedment plate measured between top and bottom surfaces of the embedment plate outside of the embedment cavity;
    wherein a perimeter of the embedment plates is hermetically seal welded to the pool liner around all lateral sides of the embedment plates to form an impervious barrier to outward leakage of pool water from the fuel pool;
    wherein the embedment plate cavities are configured such that lateral movement of the fuel rack along the base slab caused by a seismic event is restricted by engagement between the cavity walls of each cavity and the pedestal such that laterally acting seismic forces are not transmitted to the pool liner.

15. The fuel rack stabilization system according to claim 14, wherein the baseplates of the fuel racks are arranged substantially coplanar with each other and protrude laterally beyond vertical sidewalls of the tubes of each fuel rack to form horizontal protruding ledges around a perimeter of the fuel racks on all sides.

16. The fuel rack stabilization system according to claim 15, wherein peripheral edges of mating horizontal protruding ledges between adjoining fuel racks in the fuel pool are in mutual abutting engagement.

17. The fuel rack stabilization system according to claim 16, wherein the peripheral edges of the mating horizontal protruding ledges are mutually engaged for a majority of a length of the peripheral edges.

18. The fuel rack stabilization system according to claim 14, wherein the fuel racks are arranged so that mating baseplates between adjoining fuel racks are horizontally spaced apart no more than ¼ inch between peripheral edges of the mating baseplates.

19. The fuel rack stabilization system according to claim 14, wherein the cavity walls are cylindrical or rectilinear in configuration.

\* \* \* \* \*